United States Patent [19]

Basile et al.

[11] Patent Number: 5,067,011
[45] Date of Patent: Nov. 19, 1991

[54] METHOD AND APPARATUS FOR DEMODULATING CHROMINANCE SIGNALS USING A TRAINING SIGNAL IN PLACE OF A COLOR BURST SIGNAL

[75] Inventors: Carlo Basile, Flushing; Alan P. Cavallerano, Ossining; Mikhail Tsinberg, Riverdale, all of N.Y.

[73] Assignee: North American Philips Corporation, New York, N.Y.

[21] Appl. No.: 545,329

[22] Filed: Jun. 27, 1990

Related U.S. Application Data

[63] Continuation of Ser. No. 346,323, May 1, 1989, Pat. No. 4,947,241, which is a continuation of Ser. No. 224,203, Jul. 22, 1988, abandoned, which is a continuation of Ser. No. 57,880, Jun. 2, 1987, abandoned.

[51] Int. Cl.[5] .............................................. H04N 9/66
[52] U.S. Cl. .......................................... 358/23; 358/28
[58] Field of Search .................................... 358/23, 28

[56] References Cited

U.S. PATENT DOCUMENTS

| | | | |
|---|---|---|---|
| 2,820,091 | 1/1958 | Parker et al. | 358/19 |
| 4,554,576 | 11/1985 | Kao | 358/28 |
| 4,558,351 | 12/1985 | Fling et al. | 358/28 |
| 4,694,327 | 9/1987 | Demmer et al. | 358/23 |

FOREIGN PATENT DOCUMENTS

| | | | |
|---|---|---|---|
| 63985 | 4/1982 | Japan | 358/28 |
| 51387 | 3/1985 | Japan | 358/28 |
| 160287 | 8/1985 | Japan | 358/23 |

Primary Examiner—John W. Shepperd
Attorney, Agent, or Firm—Michael E. Marion

[57] ABSTRACT

An improved color subcarrier and amplitude reference signal and means for its utilization are provided for color television systems, particularly high definition, wide aspect ratio television systems wherein the high definition signal is decomposed into two signals for transmission via two separate channels and recombined at the receiver to reproduce the original high definition image.

6 Claims, 5 Drawing Sheets

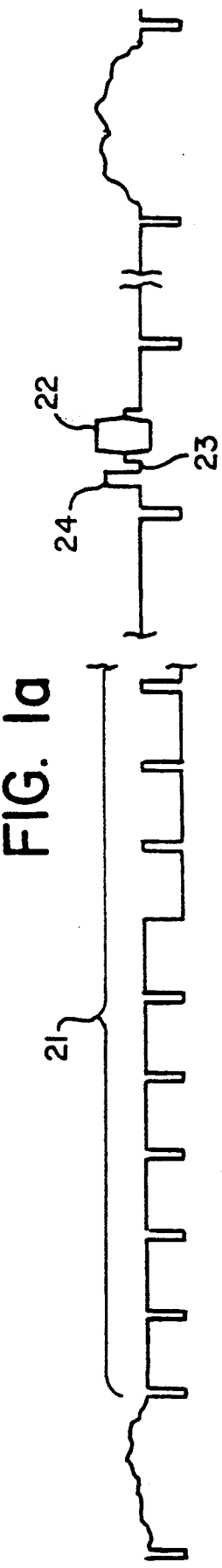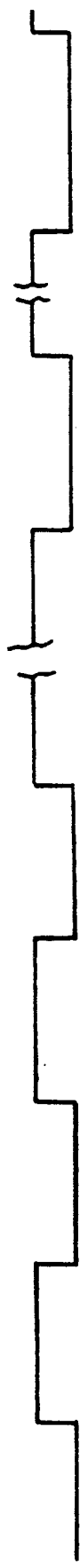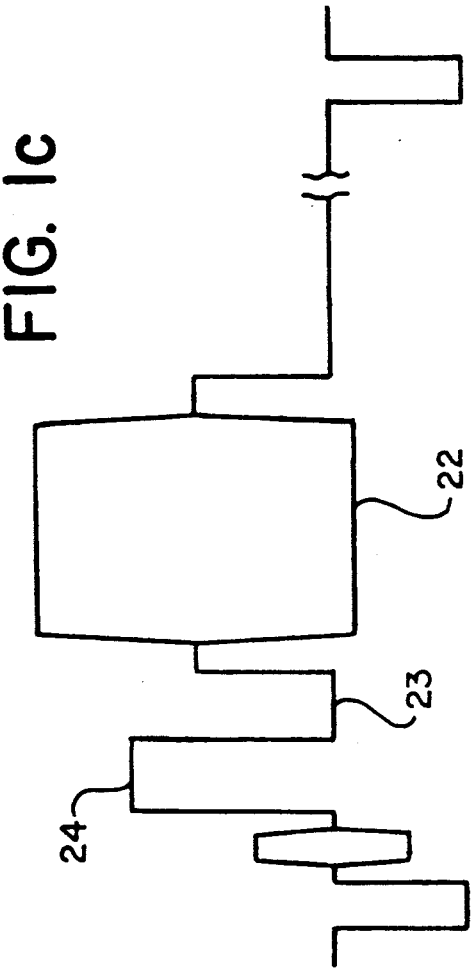

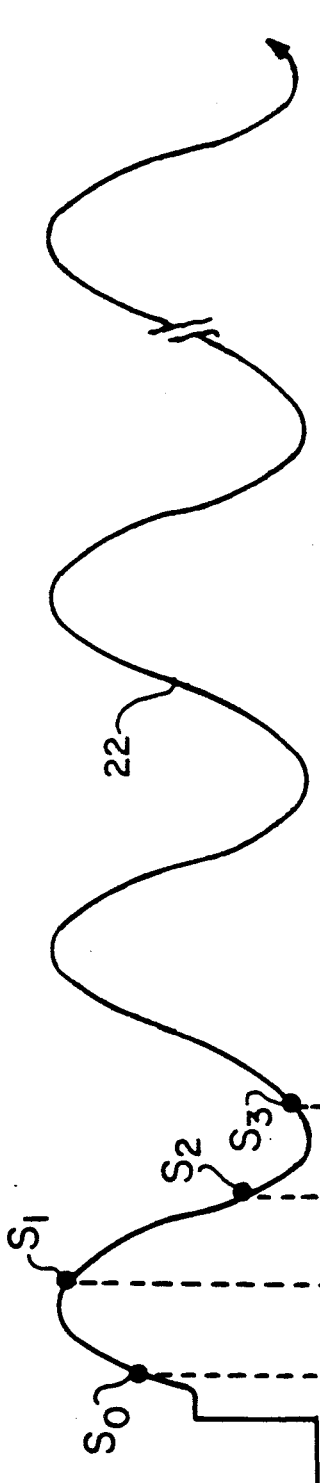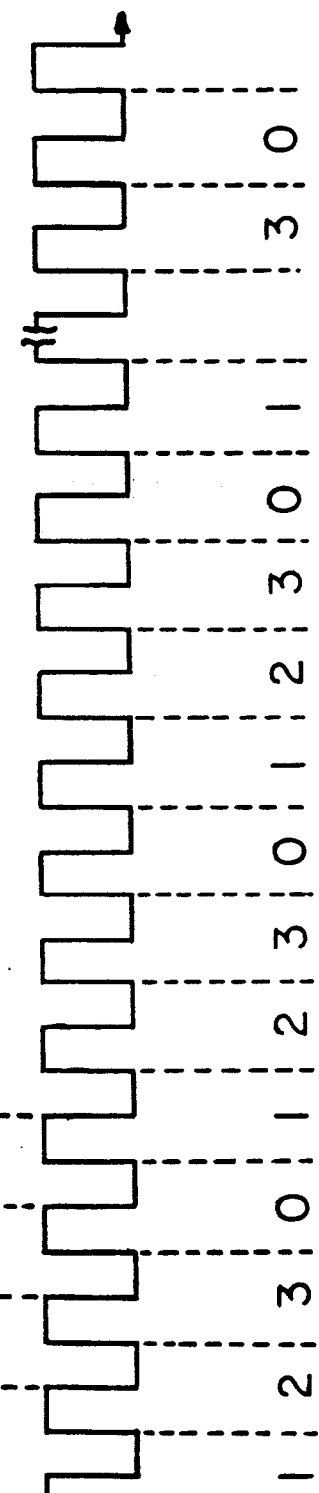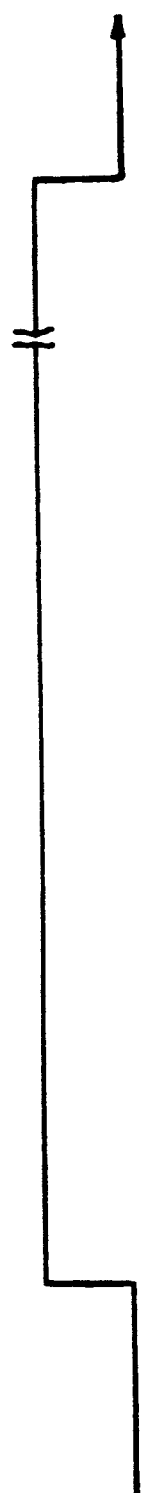

METHOD AND APPARATUS FOR DEMODULATING CHROMINANCE SIGNALS USING A TRAINING SIGNAL IN PLACE OF A COLOR BURST SIGNAL This is a continuation of application Ser. No. 07/346,323 filed May 1, 1989 now U.S. Pat. No. 4,947,241 which is a continuation of application Ser. No. 07/224,203 filed July 22, 1988, now abandoned, which is a continuation of application Ser. No. 07/057,880 filed June 2, 1987, now abandoned.

CROSS REFERENCE TO RELATED APPLICATIONS

Ser. No. 057,849, filed June 2, 1987, Alan P. Cavallerano, Carlo Basile, Mikhail Tsinberg, DECOMPOSITION AND RECOMBINATION OF A WIDE-ASPECT RATIO IMAGE, filed simultaneously herewith, common assignee.

FIELD OF THE INVENTION

This invention relates to a method and apparatus for demodulating the chrominance signal of a composite color television signal, and in particular, television signals of the NTSC format. The present invention is applicable to standard single channel NTSC color television signals, wide bandwidth high definition wide aspect ratio color television signals, and perhaps of greatest importance, to NTSC-compatible two-channel high definition wide aspect ratio color television signals.

BACKGROUND OF THE INVENTION

In the latter system, a high definition wide aspect ratio (e.g. 16:9, also referred to as 5-1/3:3) single channel signal is decomposed into a center image signal and an enhancement signal. The center image signal is transmitted via a first channel in standard NTSC format and when received by a standard NTSC television receiver, produces the center image having a 4:3 aspect ratio. The enhancement signal is transmitted via a second channel. The enhancement signal contains information for side panel images which, together with the center image signal, reproduce the original wide aspect ratio image. The enhancement signal also carries additional information for the center image that cannot be accommodated by a standard NTSC signal. This additional or enhancement information, when properly combined with the NTSC center image signal, restores the high definition that was "lost" when the center image signal was converted to a standard NTSC signal. Additional video and audio enhancement information may be carried by the enhancement signal on the second channel. Such a two channel NTSC-compatible system is described in U.S. patent application, Ser. No. 06/856,622 filed Apr. 25, 1986, now U.S. Pat. No. 4,694,339 in the name of Mikhal Tsinberg, common assignee.

In order to acceptably reproduce the full high definition wide aspect ratio picture transmitted by the two-channel system, it is necessary to have a receiver that receives both the first and second channel signals and properly stitches them back together so smoothly that the stitch is not observable by viewers. This requires that any phase difference between the first and second channel signals be compensated for and that the black level, white level and chrominance (hue and saturation) be reproduced equally for both channel signals so that no variation in brightness, contrast, hue or saturation is introduced by the process of decomposing the original high definition wide aspect ratio image into two signals, transmitting them via two separate channels, and recombining them to produce the display at the receiver.

SUMMARY OF THE INVENTION

The present invention solves some of the problems of properly recombining the two signals that are produced when the high definition signal is decomposed and transmitted via two separate channels by providing a training signal at the point of origination and using it at the receiver in a novel method of chrominance demodulation. The training signal is preferably transmitted during a line time, or portion thereof, within the vertical blanking interval. The training signal enables the receiver to establish and maintain a true phase reference for demodulating the chrominance signals of both the center image signal and the enhancement signal. The training signal is transmitted via both channels.

It is well known that color burst and sync signals are often changed, intentionally or unintentionally, between the signal source and the ultimate receiver. This can occur when the source signal is recorded and played back for later broadcast, and also during its passage through the signal delivery system, which may include coaxial cable, satellite up and down links, and cable television head end equipment. Distortion will also be introduced if the signal delivery system does not have a flat frequency response and thereby introduces a variation in gain (usually a loss) that differs at low frequencies from that at the color subcarrier frequency. This will create an error in color saturation at the receiver. Furthermore, due to variations in modulation index, demodulator tolerances, analog component tolerances, and other factors, the center and panel signals will not have the proper gain or correct black level.

When viewing images transmitted via standard NTSC signals, these variations are usually objectionable because the errors are uniform across the entire displayed image. However, when considering the two channel system described above, there will be chroma (phase and amplitude), gain, and black level errors associated with each the center image signal and the enhancement signal. An image displayed without properly correcting for these errors would be unacceptable. Variations in image properties between the center image and the panels would be particularly noticeable and annoying.

In order to provide for correct color reproduction at the ultimate receiver, notwithstanding that the burst phase has been shifted or that the signals were transmitted through channels that do not have flat frequency responses, the vertical interval reference (VIR) signal was introduced. The training signal of the present invention has certain features in common with the VIR, but is structured to provide more useful information to the receiver. A system using the methods and apparatus of the present invention compensates for the errors mentioned above, and furthermore, may be operated without reference to the NTSC color burst, thereby permitting additional information to be transmitted during the time otherwise occupied by the color burst.

Demodulation according to the present invention is accomplished by sampling and digitizing each signal, i.e. the center image signal and the enhancement signal. Each digitized signal is then processed to correct for channel attenuation and to separate the chrominance and luminance signals. The chrominance signal is demodulated by algebraically adding the values of successive samples to produce demodulated outputs.

BRIEF DESCRIPTION OF THE DRAWINGS

FIG. 1a is an illustration of a portion of the waveform of an NTSC television signal showing how the training signal of the present invention may be accommodated.

FIG. 1b is an illustration of a signal that switches state every other horizontal sync. pulse and is denoted as H/2.

FIG. 1c is a more detailed illustration of the training signal of the present invention.

FIG. 2a is a detailed illustration of a portion of the training signal of the present invention showing its relationship to a sample clock signal, a counter state, and a training gate signal.

FIG. 2b is a sample clock signal.

FIG. 2c is a sequence of numbers illustrating the states of a counter.

FIG. 2d illustrates the training gate signal of the present invention.

DETAILED DESCRIPTION OF THE PREFERRED EMBODIMENTS

Figure 3:
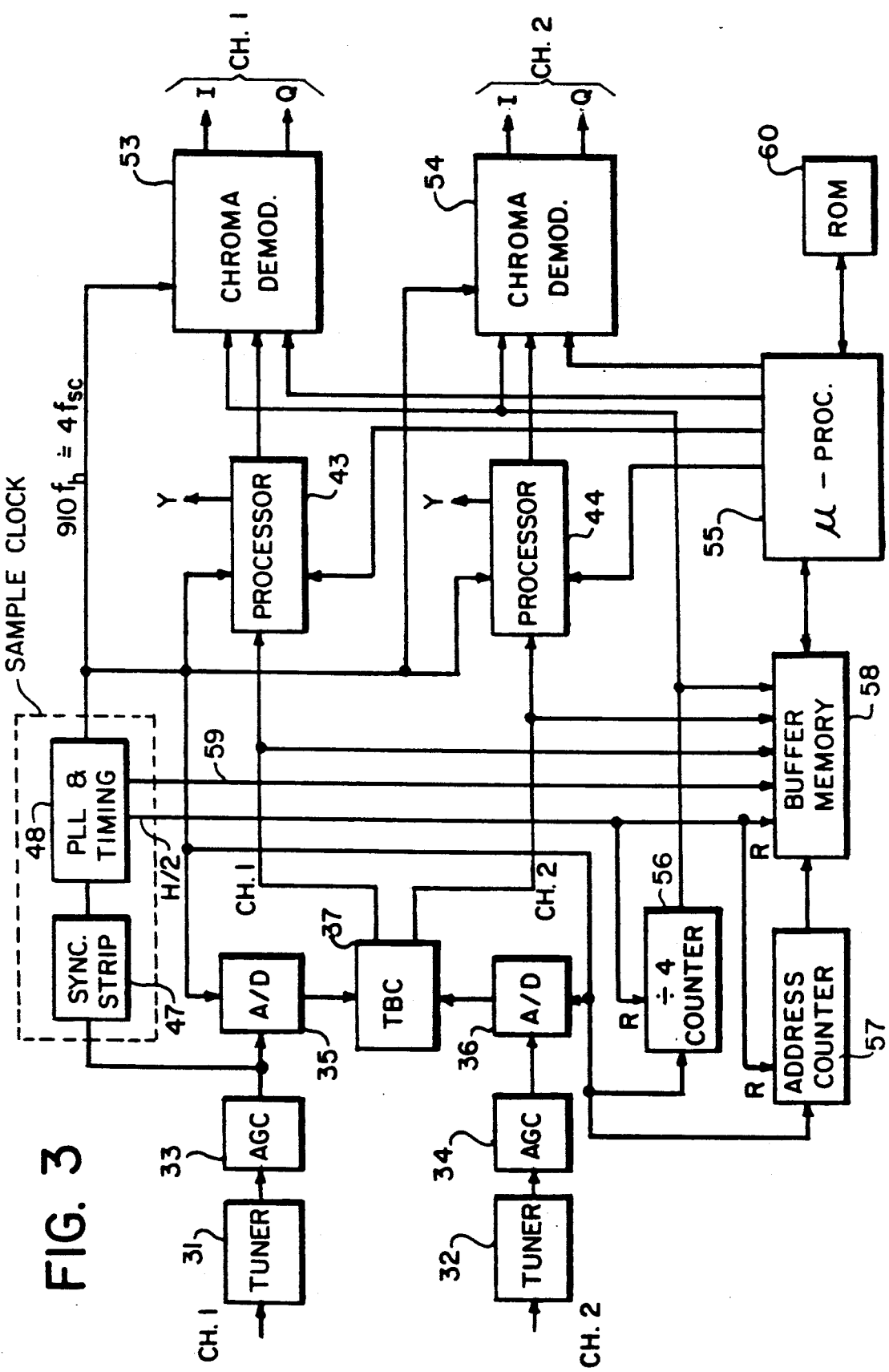
FIG. 3 is a block diagram of the functional components of a two channel receiver in accordance with the present invention.

The present invention will be described in the environment of a two-channel high definition wide aspect ratio television system that is compatible with a standard NTSC television signal. That is, one of the two channels (the center image signal) may be viewed on a standard NTSC television receiver while the original high definition wide aspect ratio image may be viewed on a high definition wide aspect ratio two-channel receiver receiving both the center image signal and the enhancement signal.

In the described system, the originating signal is a high definition (e.g. 500 line horizontal, 500 line vertical) signal having a wide aspect ratio (e.g. 16:9) compared to the standard NTSC aspect ratio (4:3). In accordance with the method described in U.S. patent application Ser. No. 06/856,622, filed Apr. 25, 1986, the originating signal is decomposed into two signals, a center image signal and an enhancement signal. These two signals are then transmitted via two standard broadcast or cable channels to the ultimate receiver, which may be either a standard single channel NTSC receiver or a high definition wide aspect ratio receiver. This disclosure will address primarily the latter.

Referring now to FIG. 1a, there is shown a waveform representative of a portion of a standard NTSC television signal. A detailed presentation of NTSC and other standards for television broadcast signals is presented in Benson, Television Engineering Handbook, McGraw-Hill, Inc., 1986. During the vertical blanking interval 21 there are transmitted a number of equalizing pulses, followed by the vertical sync. signal, followed by post equalizing pulses. There follows several scan lines that do not carry picture information. Several of the scan lines during the vertical blanking interval have been designated or reserved for teletext data, closed captioning data, VIR, etc. See, for example, U.S. Pat. No. 4,092,674, in particular, FIG. 2 thereof. There are still several lines that are available for new uses. The present invention uses one of these lines, for example line 18, for the training signal.

The training signal of the present invention comprises several cycles of the color subcarrier signal, $f_{sc}$, indicated by the reference numeral 22, preceded by a black reference level 23 and a white reference level 24. The training signal is shown in more detail in FIG. 1c, and in still more detail in FIG. 2a, wherein the black reference level 23, the white reference level 24, and several cycles of the color subcarrier frequency, $f_{sc}$, illustrated. The phase of $f_{sc}$ in the training signal is selected for convenience to equal 0 degrees with respect to the Q or I axis This is not a necessary condition, however, the mathematical explanation of the method of demodulation used by the present invention is simplified for this condition, and therefore, this condition will be assumed to exist for purposes of explanation.

Aside from the number of cycles of color subcarrier, the training signal differs from the standard VIR signal in that the subcarrier amplitude and phase and specific white level are different. These differences will be explained later. Assuming that the encoder which splits the wide aspect ratio source image into the center and panel video signals uses digital processing it is important to note that best results will be obtained if this training signal is inserted digitally within the encoder. This will eliminate any alignment and drift problems normally associated with standard VIR and VIT signal insertion techniques.

At the receiver, both signals are sampled at $910f_h = 4f_{sc}$. FIG. 2b represents the signal generated by a sample clock running at this frequency. The frequency of the sample clock may be derived from the horizontal sync pulse in one of the received channels. The sample clock signal is used as the input to a four-state counter which repetitively counts 0, 1, 2, 3. Counter states for the counter are shown in FIG. 2b.

Turning now to FIG. 3, there is shown a block diagram of a portion of a two channel receiver for receiving the center image signal and the enhancement signal and recombining them to display the original high definition wide aspect ratio image.

After being converted to baseband by tuners 31 and 32, the two channel signals are fed via automatic gain control (AGC) circuits 33 and 34 to A/D converters 35 and 36, respectively. Quantization is 9-bit linear, providing 512 possible digital values for each sample. Ordinarily, eight bit quantization is deemed satisfactory for digitizing color television signals, providing 256 possible values. Because AGC performance may permit as much as 6 db variation, however, it was decided to increase quantization to nine bits. Theoretically, the AGC function could be performed in the processors 43, 44 to be described below, providing that the level of quantization is adequate. We have chosen for the present to continue the use of AGC circuits as shown.

As noted earlier, there will be some transmission delay time for each channel. It must be assumed that the two delay times will not be the same. Accordingly, the two channel signals, after being digitized by A/D converters 35 and 36, are then delay equalized or time base corrected (the terms may be used interchangeably) by time base corrector (TBC) 37, which receives both channel signals and delays the earlier-to-arrive signal by a time equal to the delay difference so that at its outputs both signals, the center image signal on channel 1 and the enhancement signal on channel 2, have the same time relationship as the components of the original high definition wide aspect ratio signal that was decomposed to form them. Time base correction is the only parameter which is corrected independently of microprocessor 55. All other parameters are controlled in conjunction with microprocessor 55.

Both digitized signals from A/D converters 35 and 36 are routed to a one line buffer memory 58. The only lines written into the buffer memory 58 are the lines containing the training signal of each channel. As indicated, the microprocessor is integral in controlling hue, saturation, gain and black level of both video signals since it is completely responsible for providing coefficients necessary for the operation of these correction circuits. The training signals contain sufficient information such that with the proper analysis these parameters can be normalized. In the present configuration the training signal is placed on line 18 of each field, which is indicated by address counter 57, and timing generator 48 creates at 59 a training gate signal as shown in FIG. 2d which enables the write cycles of buffer memory 58 during this line. Simultaneously, microprocessor 55 releases control of the bus so as not to inhibit this write cycle. Immediately following the end of this cycle microprocessor 55 takes control of buffer memory 58 in order to execute its analysis and provide the proper coefficients. Microprocessor 55 will have one field time (16.33 milliseconds) to analyze the samples before a new line must be written. We have used an 8086 processor running at $$\left(\frac{8f_{sc}}{3}\right)$$

or approximately 9.54 MHz with a program execution time of approximately 9 msec.

To the, output of AGC 33, there is connected a sync stripper 47, which detects horizontal sync signals and outputs them to a phase lock loop and timing circuit 48 that runs at 910 times the horizontal sync pulse repetition rate of $f_h$. The frequency $910f_h$ is equal to four times the color subcarrier frequency $f_{sc}$. The sync stripper 47 and phase lock loop and timing circuit 48 operate as a sample clock to provide sampling pulses to A/D converters 35 and 36 and other circuits that will be described below. As noted above, phase lock loop and timing circuit 48 also produces the training gate signal shown in FIG. 2d. It should be noted that sync stripper 47 may operate from either the channel 1 signal or the channel 2 signal, so long as the operative channel contains the horizontal sync signal. In the two channel NTSC-compatible system, it is necessary that the center image channel signal include sync signals so that the signal will be compatible with existing NTSC receivers. Sync may or may not be included in the enhancement signal. It is contemplated that horizontal sync and color burst may be omitted from the enhancement signal. In fact, all of the standard NTSC information contained in the horizontal blanking interval may be removed from the enhancement signal, making those time slots available for the transmission of other information.

The digitized and time base equalized signals are then processed by processors 43 and 44 which compensate for attenuation of the composite video signal at both low frequencies and at the color subcarrier frequency. This compensation is performed in order to approximately restore each composite video signal to its original gain versus frequency characteristic across the relevant bandpass. It is well known that finite bandwidth channels usually attenuate the transmitted signal more at higher frequencies than at lower frequencies and that the attenuation is not uniform with frequency. This iilustrated in FIG. 5 which shows T a source signal that has a substantially constant gain across the relevant bandwidth, say from near zero to a frequency above $f_{sc}$. At R is shown the gain versus frequency characteristic of the same signal as received at the receiver. This general characteristic exists for both channels, however, it will not likely be exactly the same for both channels. Therefore, the gain versus frequency compensation must be carried out for each of the two channels. The low frequency attenuation is represented at B and the attenuation at $f_{sc}$ is indicated at A. Determination of the required gain and offset correction coefficients will be described below.

Processing of the two digitized signals is performed at the sample rate of $910f_h=4f_{sc}$. This is accomplished by using the strobe signal from the same sample clock (sync stripper 47 and PLL and timing circuit 48) that is used by the A/D converters. In addition to compensating for attenuation in the two transmission channels, processors 43 and 44 also separate chrominance and luminance. Inasmuch as we are not here concerned with how the chrominance and luminance signals are separated or with further processing of the luminance signal for either channel, it is merely noted that luminance is separated from chrominance in processors 43 and 44. This is symbolized by the outputs from each processor labeled Y.

The digitized chrominance signals from processors 43 and 44 are input respectively to chroma demodulators 53 and 54 along with additional signals that are used to carry out the novel method of chrominance demodulation. These additional signals comprise, for each demodulator 53 and 54, a coefficient calculated by microprocessor 55 and the state of a four-state counter 56. The counter 56 is advanced through its four states, 0, 1, 2, 3, at the rate of the sample clock, $4f_{sc}$. The microprocessor 55 reads and writes to buffer memory 58 that state, as noted above, and also samples several cycles of $f_{sc}$ in each training signal under control of the training gate 59 from PLL and timing circuit 48. The microprocessor 55 utilizes these samples in conjunction with data from a ROM 60 to calculate the coefficients that are supplied to the chroma demodulators. The stored data in ROM 60 is representative of the original form of the training signal as inserted at the point of origination.

Figure 5:
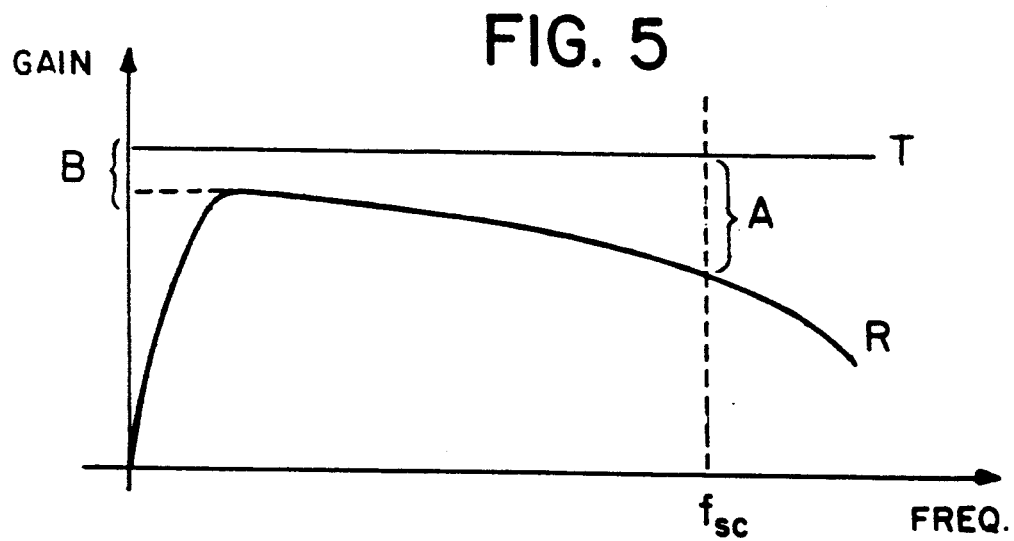
FIG. 5 is a graph showing the gain vs. frequency characteristic of a transmitted signal and that of the same signal at a receiver.

Gain and offset correction by processors 43 and 44 utilizes coefficients calculated for each of the two received signals. The training signal allows for at least 16 samples of white level, 16 samples of black level, and 32 cycles of subcarrier to be processed on the selected line (which occurs once per field). In order to suppress the noise component present on each sample, all samples representing the same information are averaged with each other and the averaged result is then taken to represent the value of that parameter. Analysis of the received white and black levels will yield results representing the low frequency gain and DC offset of the signals which can then be used to correct for contrast and black level. Determination of these two parameters is performed by solving a set of simultaneous equations. We define the received white level, $S_{wl}$, and black level $S_{bl}$, as:

$$S_{wl} = B \times WL_{ref} + DC$$

$$S_{bl} = B \times BL_{ref} + DC$$

where B represents the low frequency gain (or attenuation) as shown in FIG. 5, DC represents the DC offset and $WL_{ref}$ and $BL_{ref}$ are white level and black level reference values stored in ROM 60 at the receiver. The present configuration of the training signal contains white level at 75 IRE and black level at 7.5 IRE and the reference values stored in ROM 60 represent these values normalized to the 8-bit video bus. These values were chosen over the standard 50 IRE and 7.5 IRE levels used in the VIR signal in order to gain a signal-to-noise advantage. Therefore the gain at low frequencies is:

$$B = \frac{S_{wl} - S_{bl}}{WL_{ref} - BL_{ref}}$$

and the DC offset is:

$$DC = S_{wl} 31 \, B \times WL_{ref}$$

These results are calculated each field and averaged with the results from previous fields. The filtered results are then output to processors 43 and 44 which contain real time signal processing circuits where corrections to the video samples take place. Up to the present we have used equal weighted averaging, however, it would seem that IIR filtering might yield better results.

Conventional methods to separate luminance and chrominance, or more sophisticated techniques, can be employed. In either case the outputs after separation are center and panel luma and chroma signals. The luma signals, which have been normalized, can now be re-combined (stitched). Due to the effects of transients, stitching techniques are of reasonable complexity and will not be covered here. Reference is made, howver, to U.S. patent application Ser. No. 057,849, filed June 2, 1987, noted above. Before the chroma signals are combined they first must be demodulated. The demodulator used here consists of a two tap digital filter whose coefficients are dynamic and are provided by the microprocessor. Once the chroma signals have been demodulated they can be recombined in a similar manner as the luma signals are.

Figure 4:
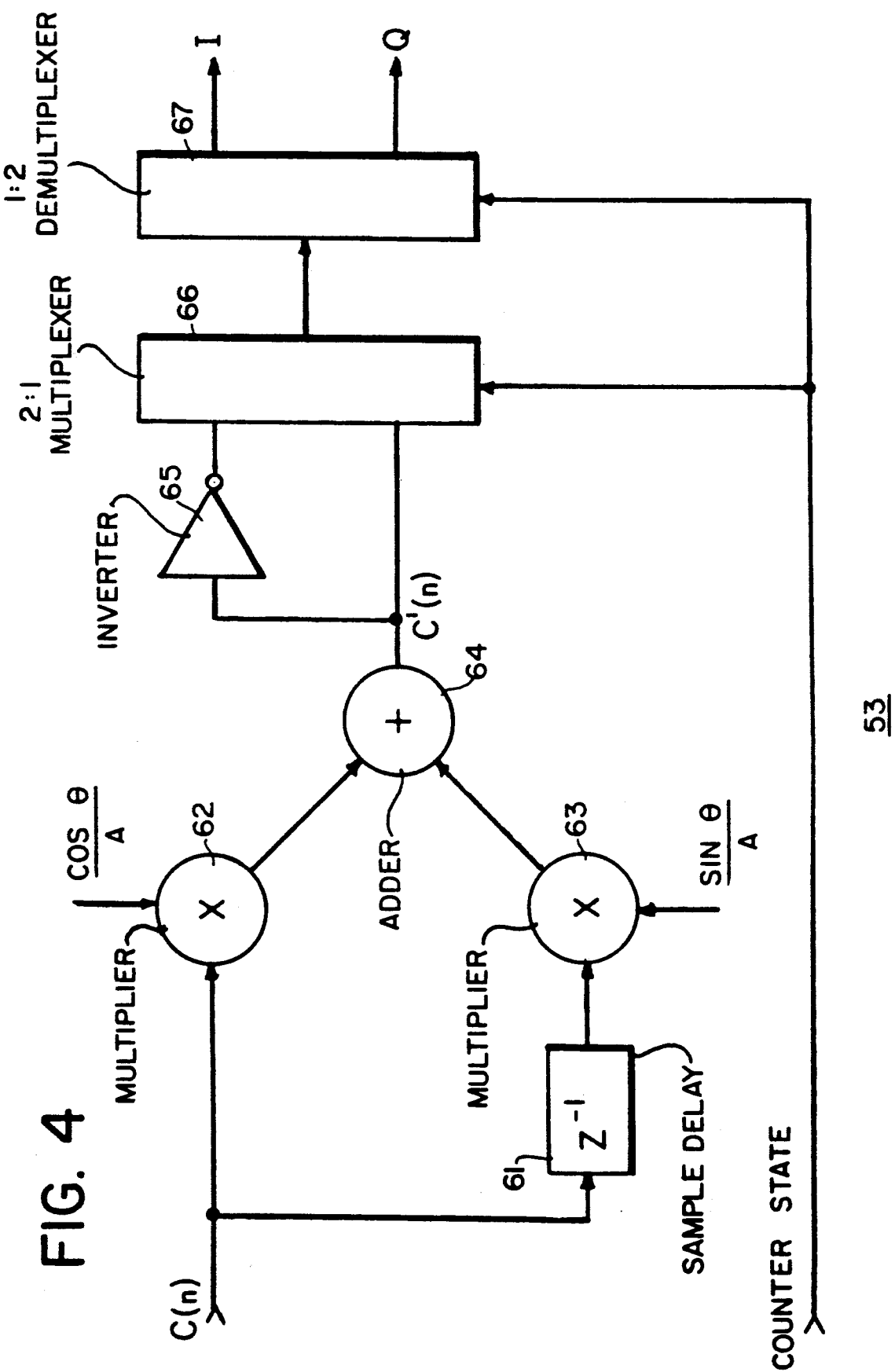
FIG. 4 is a block diagram showing an embodiment the chroma demodulator of FIG. 3 in more detail.

Each chroma demodulator, as shown in FIG. 4 consists of a two tap filter and a demultiplexer. Ordinarily with NTSC signals digitized at $4f_{sc}$, demodulation is accomplished with only a demultiplexer, however this technique requires that there is a precise phase relationship (zero degrees for R-Y, B-Y demodulation, 33 degrees for I, Q demodulation) between the sampling clock and the color burst and that the color burst is a true phase reference for the active color video. In this system, in order to compensate for the possibility that the color burst is not a precise phase reference and to allow flexibility in the sampling clock phase an alternate method was employed.

Figure 6:
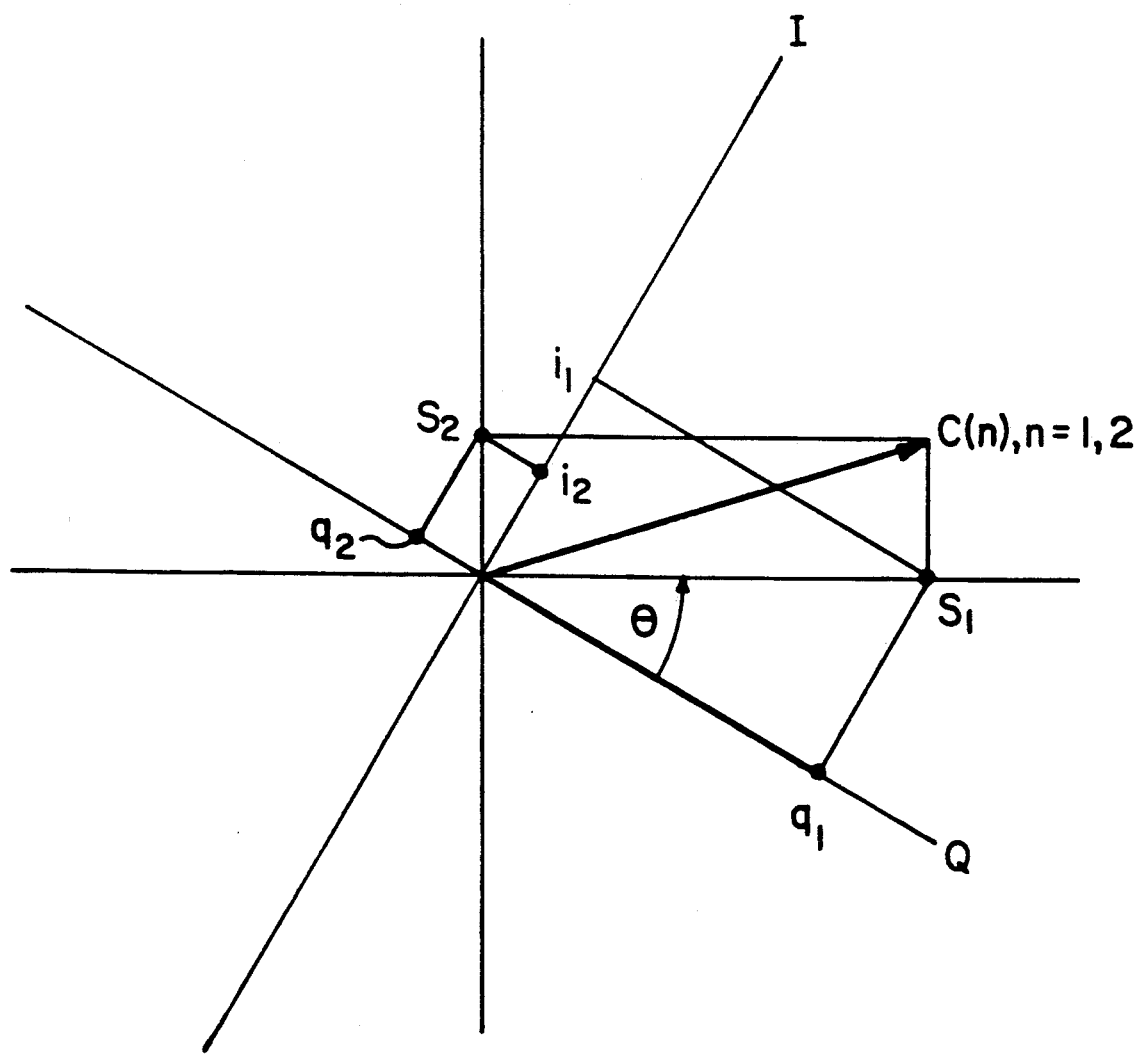
FIG. 6 is a vector diagram showing the relationships between a random value of the chrominance signal and the sampling axes and the I and Q axes.

As shown in the vector diagram FIG. 6 each chrominance sample contains an I component and a Q component. Decomposition of the I and Q components from a single sample is not possible unless the angle, $\theta$, between the sampling clock and I and Q axis is 0. degrees. However, if $\theta$ is known, combining adjacent samples $S_1$ and $S_2$ with the appropriate functions of $\theta$ will decompose the vector into its I and Q components. By processing information contained in the training signal we are able to calculate, and therefore know, $\theta$. Unlike known techniques, this technique is precise if the color vector is not varying with time. This demodulation scheme also implements saturation adjustment since the multiplier coefficients can be normalized to provide gain compensation. Derivation of the coefficients necessary for this technique will now be described.

The chrominance signal C can be represented by:

$$C = A \left[ I(t)\cos\left(\omega_{sc}t + \frac{33\pi}{180}\right) + Q(t)\sin\left(\omega_{sc}t + \frac{33\pi}{180}\right) \right]$$

With the sampling frequency of $910f_h = 4f_{sc}$, t takes on values of:

$$t = \frac{n\pi}{2\omega_{sc}} + T_a$$

where $T_a$ represents the arbitrary static phase of the sampling clock with respect to subcarrier. Therefore, the sampled chrominance signal at the input to the demodulator is:

$$C(n) = A \left[ I(n)\cos\left(\omega_{sc}\left(\frac{n\pi}{2\omega_{sc}} + T_a\right) + \frac{33\pi}{180}\right) + Q(n)\sin\left(\omega_{sc}\left(\frac{n\pi}{2\omega_{sc}} + T_a\right) + \frac{33\pi}{180}\right) \right]$$

Factoring and defining

Factoring and defining $\omega_{sc}T_a + \frac{33\pi}{180} = \theta$:

$$C(n) = A \left[ I(n)\cos\left(\frac{n\pi}{2} + \theta\right) + Q(n)\sin\left(\frac{n\pi}{2} + 0\right) \right]$$

At this point it will be shown that I and Q can be recovered from the sampled chrominance signal, C(n), with hardware configured as shown in FIG. 4 and additional input coefficients $$\frac{\cos\theta}{A} \text{ and } \frac{\sin\theta}{A}$$

provided to multipliers 62 and 63 respectively by the microprocessor. Using trigonometric identities it can be shown that:

$C(-1) = A[+I(-1)\sin\theta - Q(-1)\cos\theta]$ n = −1
$C(+0) = A[+I(0)\cos\theta + Q(0)\sin\theta]$ n = 0
$C(+1) = A[-I(1)\sin\theta + Q(1)\cos\theta]$ n = 1
$C(+2) = A[-I(2)\cos\theta - Q(2)\sin\theta]$ n = 2
$C(+3) = A[+I(3)\sin\theta - Q(3)\cos\theta]$ n = 3
$C(+4) = A[+I(4)\cos\theta + Q(4)\sin\theta]$ n = 4

Applying this signal, C(n), to multiplier 62 and to multiplier 63 through sample delay 61, the output of the adder, 64 C'(n), will be:

$$C'(n) = C(n)\frac{\cos\theta}{A} + C(n-1)\frac{\sin\theta}{A}$$

$$C'(n) = A\left[\frac{\cos\theta}{A}\left[I(n)\cos\left(\frac{n\pi}{2} + \theta\right) + Q(n)\sin\left(\frac{n\pi}{2} + \theta\right)\right] + \frac{\sin\theta}{A}\left[I(n-1)\cos\left(\frac{(n-1)\pi}{2} + \theta\right) + Q(n-1)\sin\left(\frac{(n-1)\pi}{2} + \theta\right)\right]\right]$$

Taking advantage of the bandlimited nature of the I and Q signals we can make the approximation that:

$$I(n-1) \approx I(n) = I \text{ and } Q(n-1) \approx Q(n) = Q$$

And substituting:

$C'(0) = [I(0)\cos^2\theta + Q(0)\sin\theta\cos\theta] + [I(-1)\sin^2\theta - Q(-1)\sin\theta\cos\theta] = +I$ $C'(1) = [-I(1)\cos\theta\sin\theta + Q(1)\cos^2\theta] + I(0)\cos\theta\sin\theta + Q(0)\sin\theta + Q(1)\cos^2\theta] + [+I(0)\cos\theta\sin\theta + Q(0)\sin^2\theta] = +Q$ $C'(2) = [-I(2)\cos^2\theta - Q(2)\sin\theta\cos\theta] + [-I(1)\sin^2\theta + Q(1)\sin\theta\cos\theta] = -I$ $C'(3) = [+I(3)\cos\theta\sin\theta - Q(3)\cos^2\theta] + [-I(2)\cos\theta\sin\theta - Q(2)\sin^2] = -Q$ $C'(4) = [+I(4)\cos^2\theta + Q(4)\sin\theta\cos\theta] + [+I(3)\sin^2\theta - Q(3)\sin\theta\cos\theta] = +I$ $C'(5) = [-I(5)\cos\theta\sin\theta + Q(5)\cos^2\theta] + [+I(4)\cos\theta\sin\theta + Q(4)\sin^2\theta] = +Q$ The resulting data stream is then appropriately inverted and demultiplexed in agreement with the counter states as shown in Table 1, utilizing inverter 65, multiplexer 66 and demultiplexer 67 resulting in an I data stream and a Q data stream both at a $2f_{sc}$ rate. The relationship of the clock frequency to the horizontal rate is such that this sequence will repeat itself every other line. In order to calculate the proper coefficients, the processor must have knowledge of the phase of this sequence with respect to the samples stored in the buffer. This is accomplished by the generation of an H/2 signal as shown in FIG. 1. The phase of this signal (either "1" or "0") as it occurs on line 18 is also stored in buffer 58. The H/2 signal is also used to reset divide-by-four counter 56. This process ensures complete phasing of the demodulator and accounts for all arbitrary initial conditions.

TABLE 1

| Counter State | Action |
|---|---|
| 0 | No Inversion, Connect to I output |
| 1 | No Inversion, Connect to Q output |
| 2 | Inversion, Connect to I output |
| 3 | Inversion, Connect to Q output |

Determination of the coefficients for chroma demodulation, $\frac{\cos\theta}{A}$ and $\frac{\sin\theta}{A}$ is performed by analysis of the reference burst and the associated phase of the H/2 signal. The sampled reference burst present at the receiver and written into memory can be expressed by:

$$S(n) = L + AK\cos\left(\frac{n\pi}{2\omega_{sc}} + \theta\right) + N(n)$$

where A is the gain (or attenuation) of the channel at the subcarrier frequency, $\omega_{sc}$, and N(n) is the noise.

After the training signal is written into memory microprocessor 55 reads the samples and the H/2 phase associated with that line. Since the sampling clock frequency is $4f_{sc}$, every fourth sample (i.e. all samples occurring with the same counter state) will have the same value except for the noise component. Therefore, all data values with the same counter state are averaged to suppress the noise component, resulting in a set of four values:

$$S_0 = L + AK\cos\theta = L + AK\cos\theta$$
counter state = 0

$$S_1 = L + AK\cos\left(\frac{\pi}{2} + \theta\right) = L - AK\sin\theta$$
counter state = 1

$$S_2 = L + AK\cos\left(\frac{2\pi}{2} + \theta\right) = L - AK\cos\theta$$
counter state = 2

$$S_3 = L + AK\cos\left(\frac{3\pi}{2} + \theta\right) = L + AK\sin\theta$$
counter state = 3

The value of K is a constant and is stored in ROM at the receiver. The output coefficients defined as $$C_1 = \frac{\sin\theta}{A} \text{ and } C_2 = \frac{\cos\theta}{A}$$

can be obtained by solving the following equations:

$$C_2 = \frac{\frac{S_0 - S_2}{2K}}{\sqrt{\left[\frac{S_0 - S_2}{2K}\right]^2 + \left[\frac{S_3 - S_1}{2K}\right]^2}}$$

$$C_2 = \frac{\frac{L + AK\cos\theta - (L - AK\cos\theta)}{2K}}{\sqrt{\left[\frac{L + AK\cos\theta - (L - AK\cos\theta)}{2K}\right]^2 + \left[\frac{L + AK\cos\theta - (L - AK\cos\theta)}{2K}\right]^2}}$$

$$C_2 = \frac{\cos\theta}{A}$$

$$C_1 = \frac{\frac{S_3 - S_1}{2K}}{\left[\frac{S_0 - S_2}{2K}\right]^2 + \left[\frac{S_3 - S_1}{2K}\right]^2}$$

$$C_1 = \frac{\sin\theta}{A}$$

To further increase the performance of this system, the results for $C_1$ and $C_2$, which are computed every field, can also be filtered with results from previous fields. These filtered results can then be output to the multipliers.

What is claimed is:

1. A method for demodulating a television chrominance signal comprising first and second color component signals modulated onto a color subcarrier in accordance with the NTSC format on a television signal, said television signal having no conventional color burst signal, said method comprising the steps of:

(a) generating and transmitting during each vertical blanking period a color subcarrier reference signal comprising a plurality of cycles of said color subcarrier having a predetermined phase relationship to the modulated subcarrier;

(b) sampling said color subcarrier reference signal at a sample rate equal to a multiple of the frequency of said color subcarrier and converting each sample into a digital representation thereof to produce a series of digitized samples;

multiplying each most recent digitized sample by a first factor to produce a series of first products;

multiplying each next most recent digitized sample by a second factor to produce a series of second products;

adding each first product to each second product to produce a series of sums;

inverting alternating pairs of sums of said series of sums;

directing one sum of each pair of sums to a first output to substantially reproduce said first color component signal; and directing the other sum of each pair of sums to a second output to substantially reproduce said second color component signal.

2. A television receiver comprising apparatus for demodulation chrominance signals present in a conventional television signal transmitted over a transmission path, said television signal comprising a training signal having a place of a conventional color burst signal, a color subcarrier portion occurring during the vertical blanking intervals of said television signal, said apparatus comprising:

reference means for providing a reference signal corresponding to said training signal as transmitted;

means for sampling said training signal from said television signal thereby providing a second signal which represents said training signal as received over said transmission path;

means coupled to said sampling means for processing said second signal with respect to said reference signal so as to generate a plurality of coefficients comprising $\sin\theta/A$ and $\cos\theta/A$, where $\theta$ is represents the phase difference between said second signal and a sampling signal and A represents the gain of the transmission path; and means coupled to said processing means, for utilizing said coefficients to demodulate said chrominance signals.

3. The receiver of claim 2, wherein said reference means comprises memory means for storing data representative of said training signal.

4. The receiver of claim 2, wherein said processing means comprises a microprocessor.

5. The receiver of claim 2, wherein said training signal further comprises a black level reference portion having a predetermined black level amplitude and a white level reference portion having a predetermined white level amplitude.

6. The receiver of claim 5 wherein said predetermined black level amplitude is about 7.5 IRE and said predetermined white level amplitude is about 75 IRE.

* * * * *